United States Patent [19]

Perreaut et al.

[11] Patent Number: 5,381,079
[45] Date of Patent: Jan. 10, 1995

[54] LOW POWER CONSUMPTION DYNAMIC FOCUSING CIRCUIT

[75] Inventors: Jean M. Perreaut, Dijon; Bruno F. Roussel, Genlis, both of France

[73] Assignee: Thomson Tubes and Displays, S.A., Paris, France

[21] Appl. No.: 1,103

[22] Filed: Jan. 6, 1993

[30] Foreign Application Priority Data

Jan. 10, 1992 [EP] European Pat. Off. ......... 92400067

[51] Int. Cl.$^6$ ............................................. H01J 29/58
[52] U.S. Cl. .................................................. 315/382
[58] Field of Search ............................. 315/382, 382.1

[56] References Cited

U.S. PATENT DOCUMENTS

| | | | |
|---|---|---|---|
| 4,758,762 | 7/1988 | Van Gorkum et al. | 313/440 |
| 4,987,350 | 1/1991 | Hartmann et al. | 315/382 |
| 5,043,637 | 8/1991 | Gries et al. | 315/371 |
| 5,118,998 | 6/1992 | Jackson et al. | 315/382 |
| 5,146,142 | 9/1992 | Van Tol | 315/382 |

FOREIGN PATENT DOCUMENTS

| | | |
|---|---|---|
| 0249294 | 12/1987 | European Pat. Off. . |
| 758547 | 5/1953 | Germany . |
| 2262649 | 6/1974 | Germany . |
| 2085698 | 4/1982 | United Kingdom . |

OTHER PUBLICATIONS

Soviet Patents Abstracts, Section EI, Week 8219, 32 Jun. 1982 Derwent Publications, Ltd., F6263 E/19, SU-849-541.

Soviet Patents Abstracts, Section EI, Week 8720, 27 May 1987 Derwent Publications, Ltd., 87-141775/20, SU 1259-519-A.

IBM Technical Disclosure Bulletin, *Dynamic Dynamic Focusing Circuit for High Resolution Display Monitor*, vol. 31, No. 2, 1 Jul. 1988.

*Primary Examiner*—Theodore M. Blum
*Attorney, Agent, or Firm*—Joseph S. Tripoli; Joseph J. Laks; Harvey D. Fried

[57] ABSTRACT

A focus coil for a television is disposed between scanning electron beam generator and a planar screen and has a winding coupled between a power supply and a current sink for providing a magnetic focusing field due to current in the coil. A focusing circuit comprises a resonant circuit coupled to the focus coil for generating a parabolic current in the focus coil to account for variations in the distance between the focusing device and the screen during scanning. The resonant circuit stores a portion of the energy developed during trace intervals and returns this energy to the power supply during retrace intervals. The resonant circuit includes a capacitor and an additional coil, in series with one another, and together in parallel with the focus coil. The additional coil is magnetically coupled to the focus coil and induces a reverse current in the focus coil during the retrace interval for returning energy to the power supply.

12 Claims, 7 Drawing Sheets

FIG. 5
(PRIOR ART)
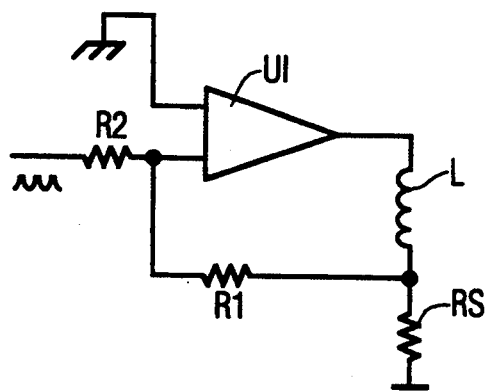
FIG. 6(a)
FIG. 6(b)
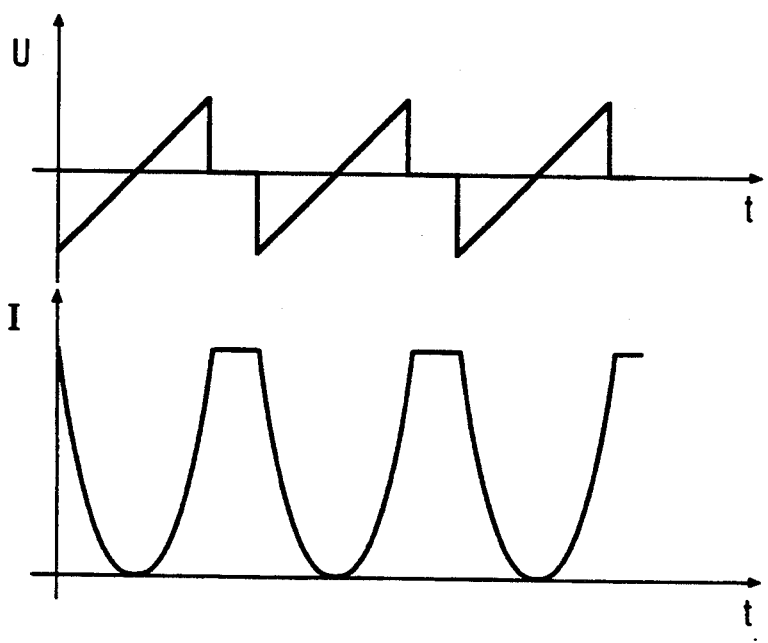

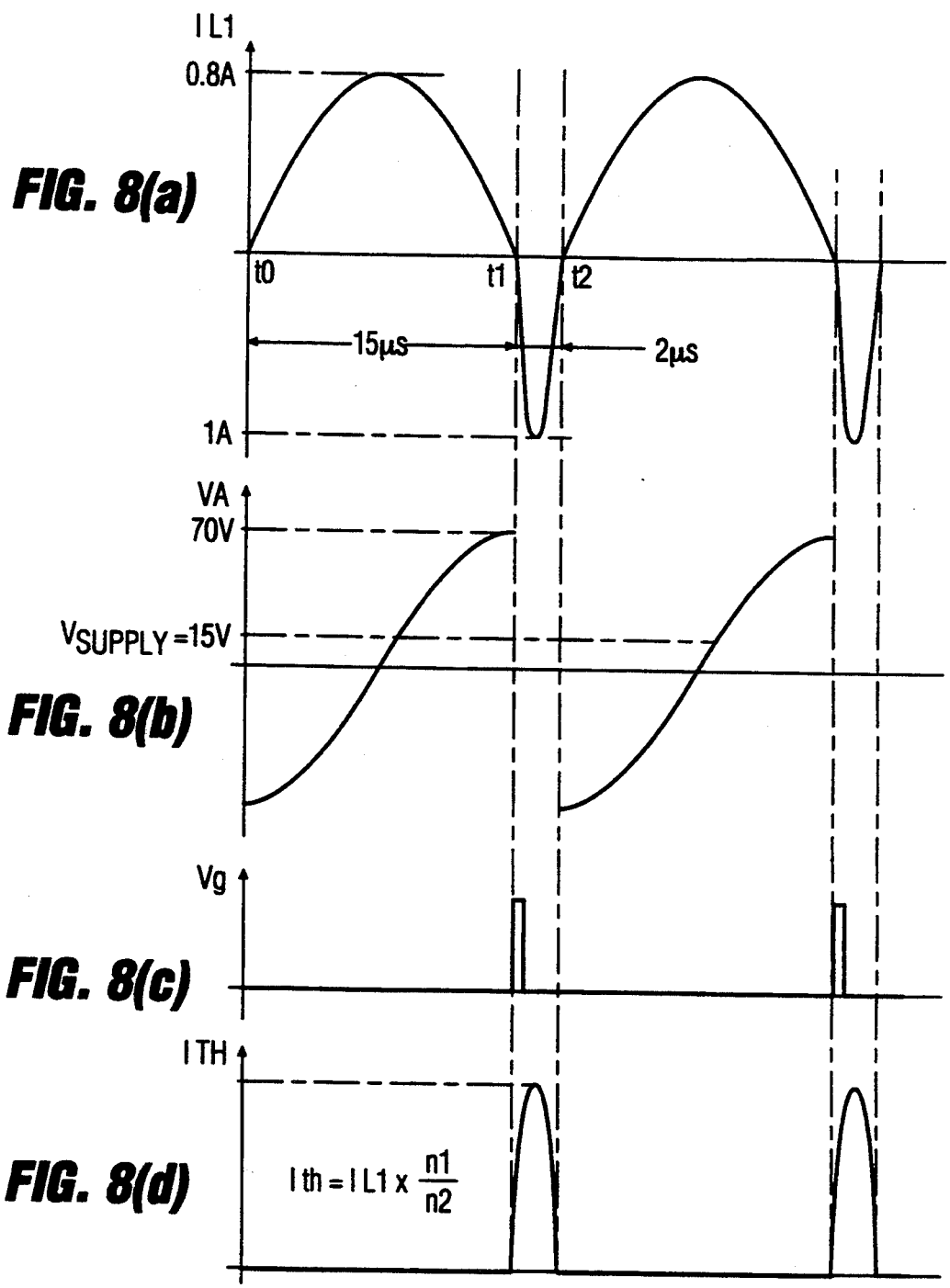

LOW POWER CONSUMPTION DYNAMIC FOCUSING CIRCUIT

BACKGROUND OF THE INVENTION

The invention relates to circuits for applying an electromagnetic field to a scanning electron beam for focusing the beam to a point on a screen or other display surface.

Electrons emitted from the cathode of a CRT are accelerated toward the screen, but tend to diverge as they travel due to electrostatic repulsion between the electrons. The electrons can be forced to converge into a tight beam at the screen using electrostatic or magnetic fields. High resolution cathode ray tubes (with very fine spots) generally use magnetic focusing units. Such tubes may be used in television receivers and in various other applications, such as copiers, facsimile machines, projection apparatus and the like, having conventional phosphor screens or fiber optic arrangements.

The focusing device forms a magnetic lens having a focal length. The (X, Y) position of the point of convergence of the beam is varied in a raster pattern by main deflection apparatus apart from the focusing device. However, the screen (or other coupling to an optical system or projection lens) is a substantially planar surface normal to the beam axis rather than a spherical surface, and as a result the distance between the focusing device and the point at which the beam is incident on the screen phosphors or spots varies as a function of the vertical and horizontal scanning position of the beam. The distance from the focusing device to the point of incidence on the screen is greater at the edges of the screen and less in the center. In order to accommodate this difference in beam path length (i.e., to converge the beam at a point as the beam scans through areas of varying path length), the focusing device is driven to produce a magnetic field which varies as a parabola at the scanning rate of the deflection circuits.

The focusing device or magnetic lens can be provided by producing a magnetic field coaxial with the electron beam using a winding which encircles the beam axis. There are different ways in which the field can be produced. According to one technique the magnetic field needed to focus the beam is produced by a circular winding enclosed in a frame, and the current in the winding is varied to produce the required focusing field, including the static and dynamic components thereof. According to another technique the magnetic field is produced by superimposing the fields of a permanent magnet and a dynamic focusing coil. The dynamic focusing coil adds to or subtracts from the field produced by the permanent magnet so that the focal length of the focusing device is shortened or lengthened, respectively.

The current needed in a coil to produce the necessary focusing deflection of the beam as a function of X and Y beam position is parabolic, as defined by the equation:

$$I = K(X^2 + Y^2)$$

where the current I is proportional to field strength; K is a constant; and X and Y are the coordinates of the spot at which the beam is incident on the screen. The beam axis is the Z axis, perpendicular to both X and Y. Whereas the laws of deviation are linear, the focus correction currents will therefore be parabolic at the respective scanning rates of the electron beam, so as to produce a field which is at maximum at the center of the screen and minimum at the edges. The field can be achieved by providing a current that adds to the field produced by a static field generator, or can be achieved by subtracting from the static field.

The most widely used means for controlling a dynamic focusing coil is to use a current amplifier. A current amplifier is shown in FIG. 5, and the voltage U at the output of the amplifier and the current I which results in the dynamic focusing coil are shown in FIGS. 6(a) and 6(b), representing several horizontal scans and retrace intervals. One of the inputs of an operational amplifier U1 is coupled to a voltage parabola signal through a series resistor R2 and the other input is coupled to a reference (ground). The current coupled through the dynamic focus coil L is sensed using a low value resistor RS in series with the focus coil and ground, and this current signal is fed back through feedback resistor R1. The current amplifier produces a current parabola in the focus coil L in response to the voltage parabola at the input to the amplifier.

A main problem encountered with a current amplifier configuration as shown in FIGS. 5, 6(a) and 6(b) is the dissipation of power. Moreover the amplifier must furnish a high current at high frequency. Scanning using this type of focusing device, especially in projection apparatus, operates between 32 and 128 kHz, requiring a high pass band for the amplifier.

Due to the slope of the required current parabola at the end points, the voltage at the terminals of the coil is quite high. As a result it is necessary to provide a high power supply voltage for the amplifier in order that the necessary voltage can be coupled to the coil. On the other hand, to avoid overvoltage conditions on retrace, the parabolic current signal remains constant during retrace. This means that the current in the output transistors of the amplifier stays at the maximum (FIG. 6(b)) while the voltage varies from its positive to negative peaks (FIG. 6(a)), resulting in additional power loss. Current amplifier configurations of this type may dissipate more than 100W.

SUMMARY OF THE INVENTION

It is an aspect of the invention that the power consumption of a circuit driving a dynamic focusing coil is substantially reduced.

It is also an aspect of the invention that a portion of the energy developed in a dynamic focus coil circuit is stored during the trace interval and returned to the power supply during retrace.

It is another aspect of the invention that a resonant current generator having two coupled induction coils is provided, tuned to provide a 180° cosine current signal during the line scan (i.e., at half line scan frequency), with recovery of energy from elements of the resonant circuit occurring during the retrace interval.

These and other aspects of the invention can be embodied in a focusing device comprising a plurality of coupled dynamic focus windings, or coils, rather than a single winding. A focus deflection winding and an additional winding are coupled magnetically. A resonant circuit produces a cosine current signal approximating a current parabola in the focus deflection winding, and stores a portion of the energy of the dynamic focusing signal. During retrace the stored energy is coupled from the additional winding to the focus deflection winding, returning to the power supply a portion of the energy, which would otherwise be dissipated, resulting in substantially decreased power supply loading.

More particularly, and in accordance with an inventive arrangement, a focusing circuit for a scanning electron beam device such as a television receiver with a beam generator produces a beam of electrons incident on a planar screen normal to the beam and a deflection circuit for scanning a point of incidence of the beam on the screen. A focus coil is disposed between the beam generator and the screen, with a winding coupled between a power supply and a current sink for providing a magnetic field due to current in the coil, the magnetic field tending to converge the electrons in the beam. A resonant circuit is coupled to the focus coil for generating a parabolic current in the focus coil. The resonant circuit stores a portion of the energy developed during a trace interval of the beam and returns this energy to the power supply during a retrace interval of the beam. The resonant circuit includes a capacitor and an additional coil in series with one another, and in parallel with the focus coil. The additional coil is magnetically coupled to the focus coil and induces a reverse current in the focus coil during the retrace interval from charge stored in the capacitor, for returning energy to the power supply. The focus coil and the resonant circuit are coupled between a DC voltage supply and a thyristor coupled to ground, the thyristor having a gate input coupled to a flyback pulse generated from the scanning deflection circuits. The circuit can also include a current source for injecting into the focus coil a steady state correction current and/or a correction signal at the vertical scanning frequency.

The resonant circuit preferably comprises a capacitor and said additional coil coupled in series, the series coupled capacitor and additional coil being coupled in parallel with the focusing coil, whereby the capacitor stores energy during the trace interval and provides energy to the additional coil during the retrace interval. The additional coil thus induces a current in the focusing coil during the retrace interval as a function of energy provided by the capacitor. The resonant circuit and the focus coil are tuned to provide a cosine current in the focus coil approximating a parabola at a scanning frequency (the center of the screen being the origin and the edges at ±90°). This is accomplished by using a resonant circuit which is tuned at half the horizontal line scan frequency.

An adjustment circuit can be coupled in parallel with at least one of the focusing coil and the resonant circuit, to modify the cosine current to more closely approximate the parabola at the scanning frequency. Additionally, an adjustment circuit can provide a current source for injecting a current in the focus coil at a vertical scanning frequency.

The adjustment circuit preferably injects a current according to the formula wherein the cosine focusing deflection current of the focus coil is modified by:

$$\cos\theta - \left(\frac{3}{2} - \sqrt{2}\right)\cos(2\theta),$$

where $\theta$ is an angular variation from a center of scan.

The focusing coil is coupled between a constant voltage power supply and a thyristor coupled to ground, the thyristor having a gate input coupled to a retrace signal occurring upon initiation of the retrace interval.

The resonant circuit includes a capacitor and the additional coil in series, and is coupled between the focus coil and ground. The inductance and capacitance values needed to achieve the foregoing functions are described in detail hereinafter.

According to one inventive embodiment, the beam is subjected to a dynamic field resulting from the parabolic current and to a static field, and the static field and the dynamic field have maximums which are substantially coincident along a path of the beam as a result of the static and dynamic fields being provided by a permanent magnet and focus coil which are mounted together, or by the static field and the dynamic field being provided using a single winding, whereby centers of the static field and the dynamic field along the beam are coincident along the beam axis.

BRIEF DESCRIPTION OF THE DRAWINGS

FIG. 5 is a schematic diagram showing a current amplifier according to the prior art for driving a dynamic focusing coil.

FIGS. 6(a) and 6(b) are timing graphs showing the voltage at the output of the amplifier of FIG. 5, and the driving current for the dynamic focus coil, respectively.

FIGS. 8(a) through 8(d) are timing diagrams illustrating the current and voltage conditions at the indicated points in the circuit according to FIG. 7.

DETAILED DESCRIPTION OF THE PREFERRED EMBODIMENTS

Figure 1:
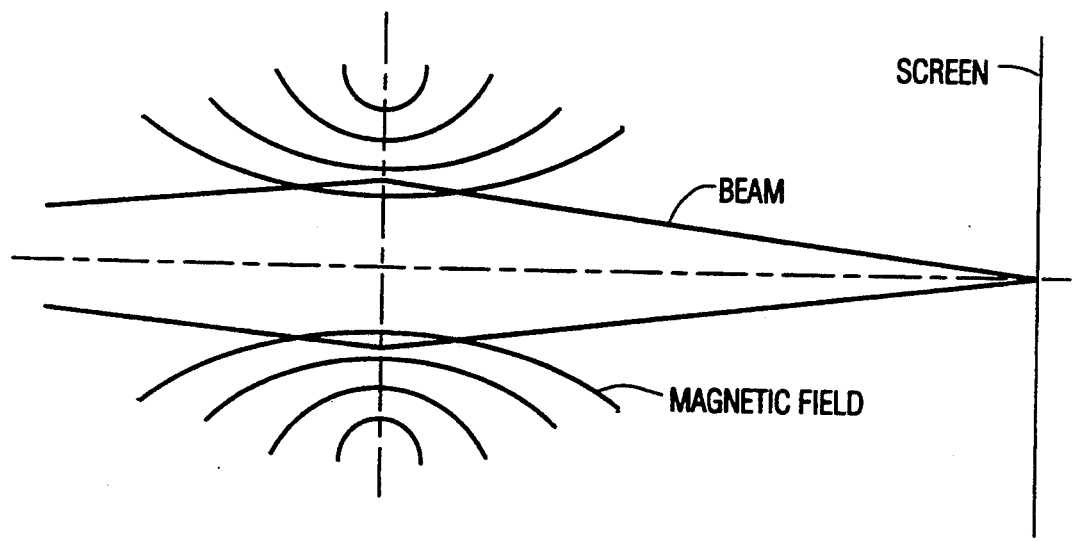
FIG. 1 is a diagrammatic section view along the beam axis of an electron beam illustrating focusing the diverging beam to a point using a magnetic field.
Figure 2:
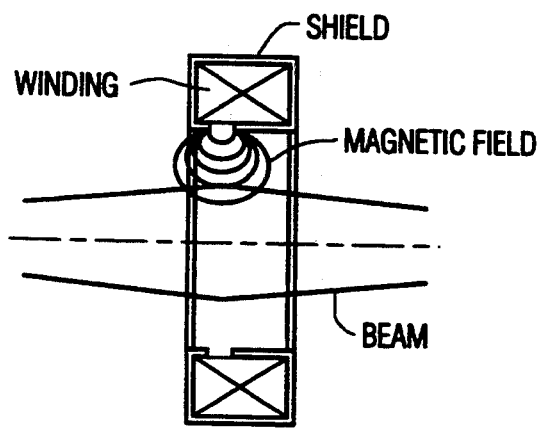
FIG. 2 is a sectional view along the beam axis showing the components of a focusing coil.
Figure 3:
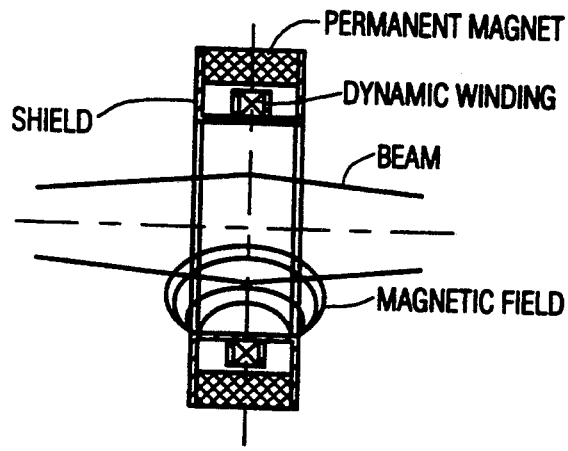
FIG. 3 is a sectional view corresponding to FIG. 2 and showing a focusing coil having a permanent magnet and a dynamic coil winding.

For producing a point-focused electron beam at a screen as shown in FIG. 1, a magnetic field generated by a focus coil accelerates the electrons in a diverging electron beam to converge, i.e., toward the beam center axis. The magnetic field can be produced, for example, by a winding coupled to the required current signal as shown in FIG. 2, or by the combination of a winding and a permanent magnet. In the event a winding is used in connection with a scanning electron beam apparatus, it is necessary to supply a current having a static component and a dynamic component, for reasons which are evident from FIG. 4. In the event a permanent magnet is included, the static component can be provided by the permanent magnet and the dynamic component can be provided by the dynamic coil.

Figure 4:
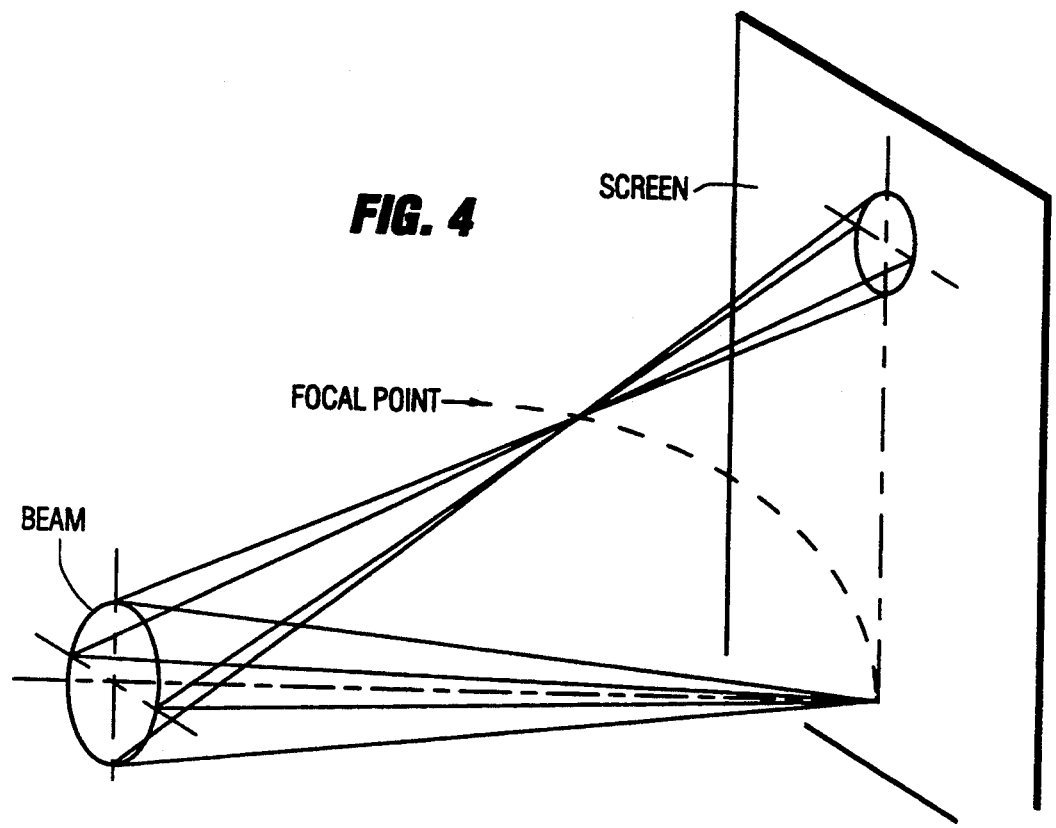
FIG. 4 is a perspective illustration of an electron beam incident on a flat screen normal to the axis of the beam, showing the variation in beam length between the center and the edges of the screen.

In FIG. 4, the beam is assumed to be subject to a static focusing field. However, the screen is flat, and as a result the distance from a given point along the beam (in particular the position of the focus coil) to the point of incidence on the screen varies as the beam is scanned. If the beam is statically focused at a particular distance, the beam will not be properly focused at longer or shorter distances from the focus coil. Accordingly, the focus coil is driven synchronously with scanning using a driving current signal that effectively adjusts the focal length of the focusing device to reflect the distance to the point of incidence on the screen at the present position of the scanning beam.

FIG. 6(b) shows the current needed in the focusing coil to achieve the desired deflection, and this current can be obtained by coupling the focus coil across the voltage signal shown in FIG. 6(a). Whereas according to the prior art this is done with a current amplifier as in FIG. 5, the present invention uses a circuit which is tuned to the line scan half-frequency, with recovery of energy during the horizontal retrace interval.

Figure 7:
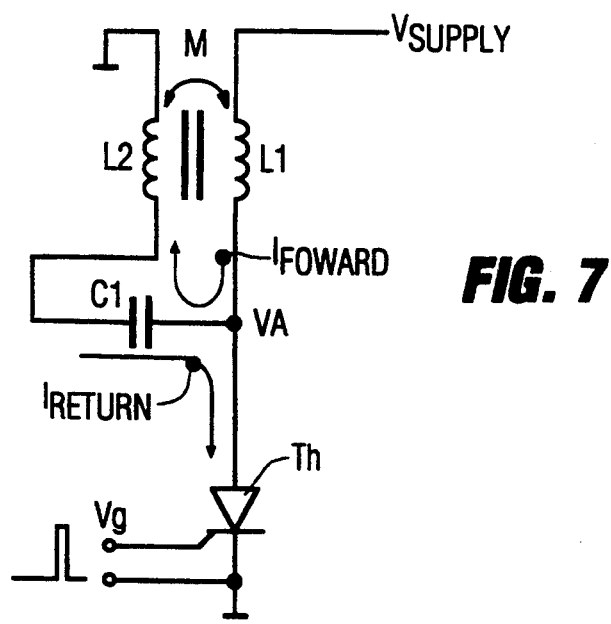
FIG. 7 is a schematic diagram illustrating the circuit according to the invention.

A main aspect of the current generator of the invention is the use of two coupled induction coils L1 and L2, shown in FIG. 7. Induction coil L1 is in fact the dynamic focusing winding in which the parabolic current must flow during the trace interval. The current in induction coil L1 produced according to the invention is shown in FIG. 8(a), through two horizontal scans.

The supply voltage $V_{SUPPLY}$ is constant, for example 15 VDC. According to the exemplary circuit discussed, the current drain on the supply is about 230 mA, thus dissipating about 3.5W. Coil L1 is coupled between the supply voltage and the anode of a thyristor having a cathode coupled to ground. The gate input of the thyristor is coupled to the flyback pulse $V_G$, the narrow pulse which occurs at the beginning of horizontal retrace, initiating conduction through the thyristor during the retrace interval. When the thyristor coupled between coil L1 and ground ceases to conduct (i.e., at time $t_0$), for reasons which will become clear in connection with the explanation of the voltage variations occurring at point VA, current $I_{FORWARD}$ flows from the supply voltage $V_{SUPPLY}$ across coil L1, capacitor C1 and coil L2, the latter being coupled to ground. During this phase, capacitor C1 is charged (more positive on its terminal coupled to point VA). The thyristor is nonconductive during the trace interval, pending a next flyback pulse, and the voltage at point VA rises toward its peak, for example 70V.

The induction coils L1, L2 and the capacitor C1 form a tuned circuit whose characteristic frequency is one half the scanning frequency. The current passing through coil L1 is therefore shaped as a cosine, as shown in FIG. 8(a), the center of the screen being the origin.

At time $t_1$, on the leading edge of the flyback pulse $V_G$ (FIG. 8(c)), thyristor Th becomes saturated, and essentially grounds point VA. The energy stored in capacitor C1 now circulates between capacitor C1, coil L2 and thyristor Th. As a result of the coupling between coils L1 and L2, and the current produced in coil L2 in the direction Of $I_{RETURN}$, stored energy is transferred to coil L1. Coil L1 now conducts in the opposite direction as shown in FIG. 8(a) between points $t_1$ and $t_2$, returning the stored energy to the power supply.

Thyristor Th, for example a silicon controlled rectifier, is triggered by a simple positive pulse on the gate input $V_G$ thereto. The thyristor Th continues to conduct after triggering so long as charge remains to be drained, i.e., until current flow ceases. When current through thyristor Th ceases, as shown at time $t_2$ in FIG. 8(d), all the available stored energy has been extracted, and thyristor Th becomes reverse biased because capacitor C1 has been charged in the opposite direction by current $I_{RETURN}$. With cutoff of thyristor Th the voltage at point VA drops to a negative peak. The cycle begins again at $t_2$ in the identical manner as at $t_0$, with current in coil L1 rising sinusoidally at the beginning of the trace. Where the origin is considered the center of the screen the current defines a cosine between $-90°$ and $+90°$. The current in the thyristor is related to the number of turns of the respective coils, according to the relationship:

$$I_{Th} = I_{L1} \times \frac{n1}{n2}$$

where n1 is the number of turns of L1 and n2 is the number of turns of L2.

The ratio of the values for the two windings L1 and L2 is a function of scan timing. Furthermore, the values for the sum of inductances of coils L1 and L2 and the capacitance of capacitor C1 are defined with reference to the forward scan time and the values for coil L2 and C1 are determined by the retrace time of the scanning system.

During trace, coils L1 and L2 are effectively in series. Assuming that the coupling between coils L1 and L2 is perfect, the inductance relationship can be calculated from the required timing relationship.

$$L = L_1 + L_2 + 2\sqrt{L_1 L_2}$$

$$Ta = \pi\sqrt{LC_1} = \pi\sqrt{(L_1 + L_2 + 2\sqrt{L_1 L_2})C_1}$$

$$Ta = \pi\sqrt{(L_1 + L_2)^2 C_1} \text{ or } \frac{Ta}{\pi\sqrt{C_1}} = \sqrt{L_1} + \sqrt{L_2}$$

During retrace, coil L2 and capacitor C1 together form the tuned circuit. Therefore the following relationships apply for correlating the retrace time $\tau$ with the respective values of inductance and capacitance such that the current conducted through thyristor Th drops off sinusoidally at the end of the retrace interval:

$$\tau = \pi\sqrt{L_2 C_1} \text{ or } \frac{\tau}{\pi\sqrt{C_1}} = \sqrt{L_2}$$

Hence, we obtain:

$$\frac{L_1}{L_2} = \left(\frac{Ta}{\tau} - 1\right)^2$$

Systems using the arrangement described hereinabove will necessarily be governed by this formula.

Adjustment of the amplitude of the dynamic current is done by setting the level of the supply voltage, which must be kept stable in order to avoid focus drift. Thermal drift due to variation in the resistance of the windings is negligible.

Figure 9:
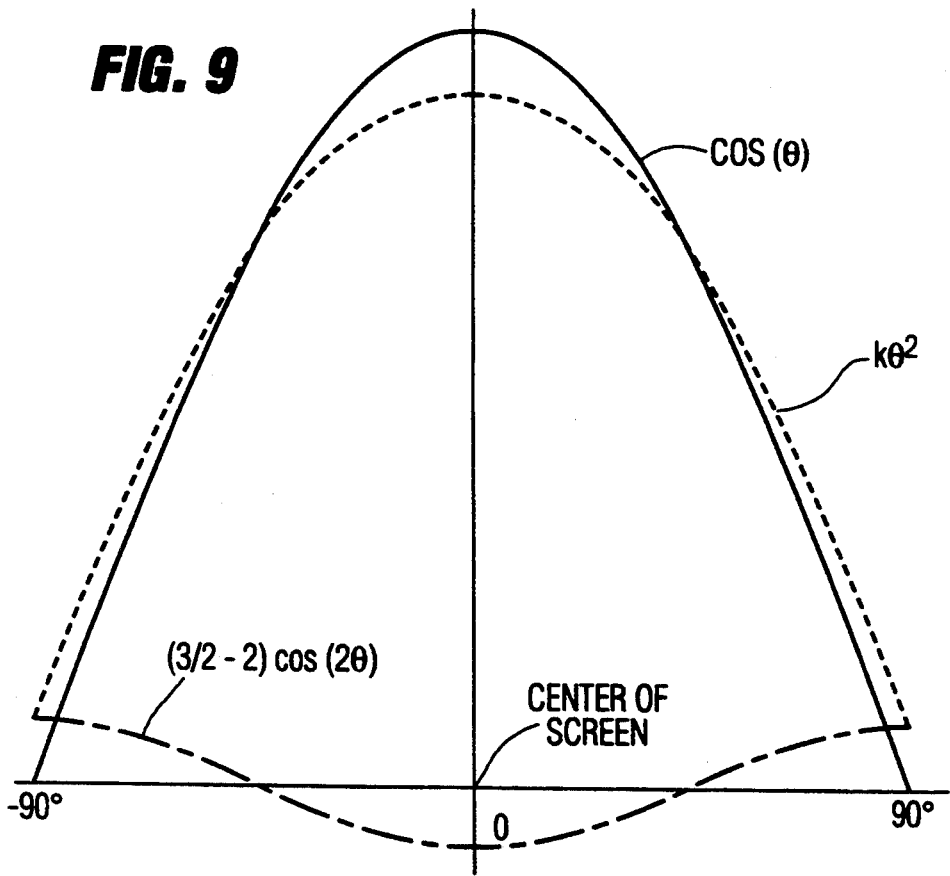
FIG. 9 is a timing diagram illustrating generation of a parabola from the sum of certain cosine signals according to the invention.

The basic circuit as explained provides a cosine current signal; however the geometric solution for the distance from the focusing coil to the screen defines a parabola. FIG. 9 illustrates a circuit whereby a more accurate parabola can be approximated from the sum of cosine functions. The circuit as just described provides a succession of cosine currents during successive traces, as related to the center of the screen. The maximum current of the parabola applied to the dynamic focus coil (or supplementing a steady state current in a single winding) occurs at the center of the screen, which is considered the origin. For applications which do not require the highest precision the simpler cosine solution may be suitable. If higher precision is needed, it is desirable to revise the shape of the waveform to more nearly trace a precise parabola.

A parabola between the two points $\theta 1$ and $\theta 2$ can be approximated by the sum of two cosines with a substantial precision as shown in FIG. 9. This approximation is accomplished according to the relationship:

$$k\theta^2 = \cos(\theta) - \left(\frac{3}{2} - \sqrt{2}\right)\cos(2\theta)$$

Figure 10A:
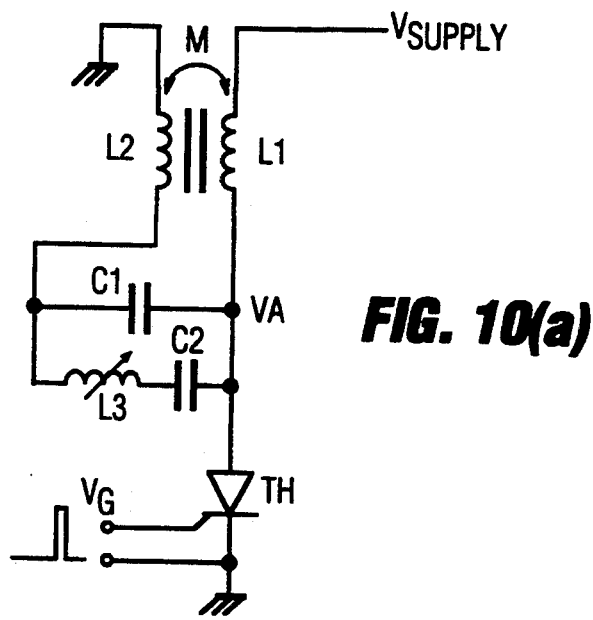
FIG. 10 is a schematic diagram of an alternative embodiment of the circuit according to the invention.
Figure 10B:
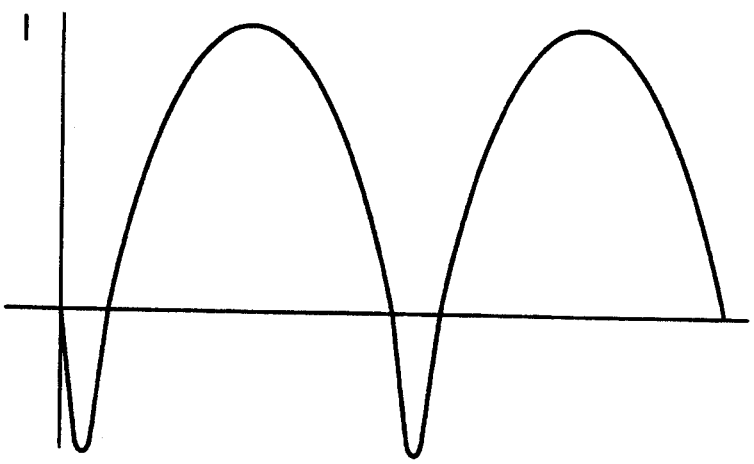
Figure 10C:
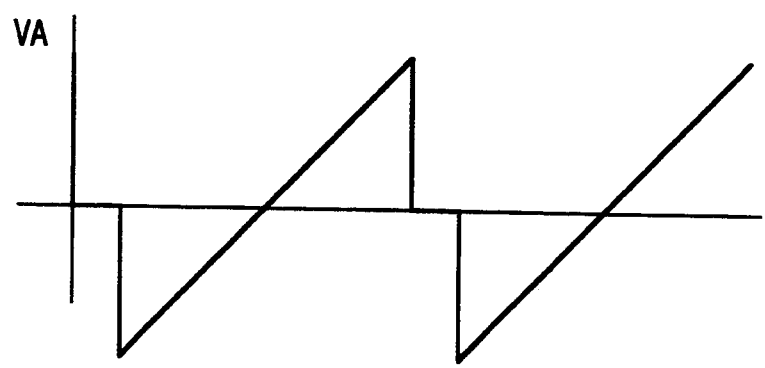

Given the circuit according to FIG. 10, one adds in parallel with the capacitor C1 a resonant circuit formed by capacitor C2 and coil L3. This circuit is arranged to operate at twice the frequency of the circuit defined by coils L1, L2 and capacitor C1, producing an additional current signal shown in FIG. 9 in dash-dot lines. When the current flowing in this additional parallel circuit is added to the main current through capacitor C1, the resulting parabola is more accurately shaped. Coil L3 permits the precise adjustment of the circuit, and as shown in FIG. 10 can be provided as a tunable inductor for precise adjustment of the circuit to achieve optimum focus across the screen. The voltage across the terminals of inductor L1 then becomes linear, i.e., the differential of the current.

Figure 11:
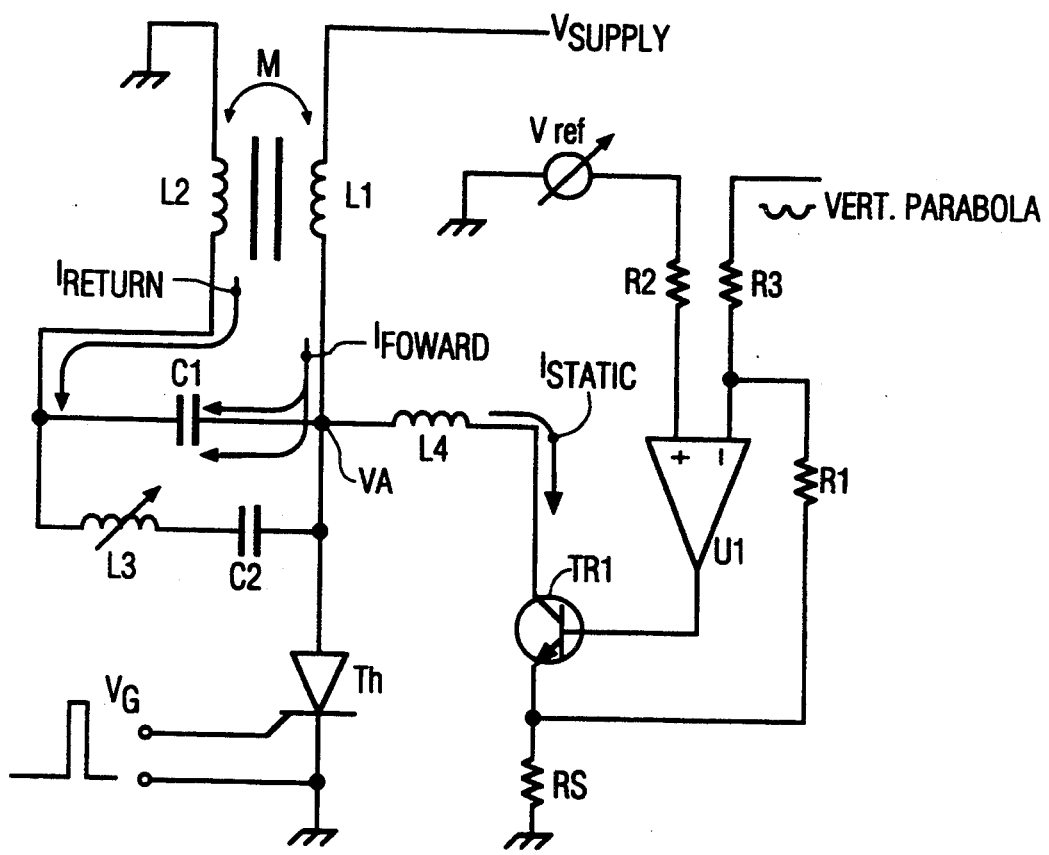
FIG. 11 is a schematic diagram of an alternative embodiment of the invention including the circuit of FIG. 10 coupled to means for also producing a static current in a focusing coil.

If the focusing device is provided with a permanent magnet, the static focusing field be adjusted by means of a direct current passing through an auxiliary winding producing a field which is superimposed on the field of the permanent magnet. To be perfectly effective the field produced by the dynamic focusing device must be superimposed precisely on the static focusing element. In other words the maximum of the magnetic fields from the static and dynamic elements must coincide along the axis of the electron beam for the most accurate focusing results. According to the invention the static and dynamic elements can be merged into one, for example using a single winding. The static/dynamic winding carries a direct current component according to the circuit of FIG. 11. Coil L4 serves as a blocking coil for the dynamic current but passes a static current driven by a current amplifier configuration having a driver transistor coupled between coil L4 and ground. The current amplifier provides a current component as defined by an adjustable DC voltage reference coupled to an input of the current amplifier, and is included in order to obviate thermal resistance variations which would entail a variation of the static focusing as well as current variation due to the dynamic current adjustment by the power supply.

At the same time, current control amplifier including operational amplifier U1 injects a current parabola at the frame frequency for vertical focus correction. Coil L4 has a low impedance at the vertical frequency, which is much lower than the horizontal scanning frequency, and is coupled to the summing junction VA. Current is extracted from the summing junction through coil L4 via an output transistor TR1 coupled to the output of amplifier U1. The amplifier configuration has a sensing resistor RS and feedback resistor R1 as does the current amplifier of FIG. 5. A static component and a dynamic component are coupled to the amplifier inputs through series resistors R2, R3. Accordingly, the circuit benefits from current control provided by the feedback amplifier of the current amplifier configuration while also achieving substantial reduction of power dissipation in the focusing circuit as a whole.

What is claimed is:

1. A focusing circuit for a scanning electron beam, comprising:
    at least one focus coil having a winding coupled between a power supply and a current sink for providing a magnetic field due to current in said focus coil; and,
    a resonant circuit having an additional coil magnetically coupled to said focus coil for generating a current in said focus coil, said resonant circuit being operable to store a portion of energy developed during trace intervals of said beam and to return said portion of energy to said power supply during retrace intervals of said beam.

2. The focusing circuit of claim 1, wherein said resonant circuit induces a reverse current in said focus coil during said retrace intervals.

3. The focusing circuit of claim 2, wherein said resonant circuit further comprises a capacitor coupled to said second coil, said capacitor being charged during said trace intervals and discharged during said retrace intervals.

4. A focusing circuit for a scanning electron beam, comprising:
    at least one focus coil having a winding coupled between a power supply and a switching circuit for providing a magnetic field due to current in said focus coil, said switching circuit being coupled between said focus coil and ground, and being operable to conduct during retrace intervals of said beam; and,
    a resonant circuit having an additional coil magnetically coupled to said focus coil for generating a current in said focus coil, said resonant circuit being operable to store a portion of energy developed during trace intervals of said beam and to return said portion of energy to said power supply during said retrace intervals of said beam.

5. The focusing circuit of claim 4, wherein said switching circuit comprises a thyristor having a gate input coupled for receiving flyback pulses occurring upon initiation of said retrace intervals.

6. The focusing circuit of claim 4, wherein said resonant circuit further comprises a capacitor coupled in series with said additional coil.

7. A focusing circuit for a scanning electron beam, comprising:
    at least one focus coil having a winding coupled between a power supply and a current sink for providing a magnetic field due to current in said focus coil;

a resonant circuit having an additional coil magnetically coupled to said focus coil for generating a current in said focus coil, said resonant circuit being operable to store a portion of energy developed during trace intervals of said beam and to return said portion of energy to said power supply during retrace intervals of said beam; and, said focus coil and said resonant circuit being tuned to provide a cosine current in said focus coil approximating a parabola at a frequency of scanning.

8. The focusing circuit of claim 7, further comprising an adjustment circuit coupled in parallel with at least one of said focusing coil and said resonant circuit for modifying said cosine current to more closely approximate said parabola at said scanning frequency.

9. The focusing circuit of claim 8, wherein said scanning frequency is a horizontal scanning frequency and said adjustment circuit further comprises means for injecting a current into said focus coil at a vertical scanning frequency.

10. The focusing circuit of claim 8, wherein said adjustment circuit is operable to inject a current according to the formula:

$$\cos\theta - \left(\frac{3}{2} - \sqrt{2}\right)\cos(2\theta),$$

where $\theta$ is an angular variation from a center of scan.

11. The focusing circuit of claim 3, wherein the duration (Ta) of said trace intervals, the duration ($\tau$) of said retrace intervals, the inductance (L1) of said focusing coil, the inductance (L2) of said second coil and the capacitance (C1) of said capacitor are related according to the formulas:

$$\tau = \pi\sqrt{L_2C_1} \text{ and } \frac{L_1}{L_2} = \left(\frac{Ta}{\tau} - 1\right)^2.$$

12. A focusing circuit for a scanning electron beam, comprising:

at least one focus coil having a winding coupled to a power supply and a current sink for generating a magnetic field due to current in said focus coil;

a switch coupled to said winding and said current sink, said switch being operable to conduct during retrace intervals of said beam;

a resonant circuit having a second coil magnetically coupled to said at least one focus coil and having a capacitor coupled in series with said second coil;

said focus coil and said resonant coil being tuned to generate a cosine current approximating a parabola at a scanning frequency in said focus coil;

said resonant circuit being operable to store a portion of energy developed during trace intervals of said beam and to return said portion of energy to said power supply during said retrace intervals; and, means coupled to at least one of said focus coil and said resonant circuit for injecting an adjustment current at a vertical scanning frequency into said focus coil.

* * * * *

UNITED STATES PATENT AND TRADEMARK OFFICE
CERTIFICATE OF CORRECTION

PATENT NO. : 5,381,079

DATED : January 10, 1995

INVENTOR(S) : Jean M. Perreaut et al.

It is certified that error appears in the above-identified patent and that said Letters Patent is hereby corrected as shown below:

On the title page, item [56],

Under "References Cited" "U.S. PATENT DOCUMENTS" delete the fourth reference [5,118,998] and insert --5,118,999--

Signed and Sealed this

Sixteenth Day of April, 1996

Attest:

BRUCE LEHMAN

*Attesting Officer*  *Commissioner of Patents and Trademarks*